(12) United States Patent
Kim

(10) Patent No.: US 6,637,323 B2
(45) Date of Patent: Oct. 28, 2003

(54) JUICE EXTRACTOR

(76) Inventor: Young-Ki Kim, 326-10 Deokcheon 2-dong, Buk-gu, Busan (KR)

( * ) Notice: Subject to any disclaimer, the term of this patent is extended or adjusted under 35 U.S.C. 154(b) by 0 days.

(21) Appl. No.: 10/255,643

(22) Filed: Sep. 27, 2002

(65) Prior Publication Data

US 2003/0154867 A1 Aug. 21, 2003

(30) Foreign Application Priority Data

Feb. 15, 2002 (KR) ............................................. 2002-4554

(51) Int. Cl.[7] .............................. A23N 1/00; A23N 1/02; A47J 43/046; A47J 43/07
(52) U.S. Cl. .............................. 99/510; 99/495; 99/513; 100/117; 100/145
(58) Field of Search .................. 99/348, 495, 509–513; 100/117, 145, 147, 148; 241/37.5, 92, 93, 260.1, 282.1, 169.1; 366/197–199, 205, 306, 318, 601; 210/173, 174; 426/481, 482, 489, 518, 616

(56) References Cited

U.S. PATENT DOCUMENTS

| | | | | |
|---|---|---|---|---|
| 4,429,626 A | * | 2/1984 | Ihara et al. | 99/510 |
| 4,440,074 A | * | 4/1984 | Ihara et al. | 99/510 |
| 5,396,836 A | * | 3/1995 | Kim | 99/510 |
| 5,452,650 A | * | 9/1995 | Lee | 99/510 |
| 5,906,154 A | * | 5/1999 | Yoon et al. | 99/510 |
| 5,970,860 A | * | 10/1999 | Yip | 99/510 |
| 6,425,321 B1 | * | 7/2002 | Yip | 99/510 |

* cited by examiner

Primary Examiner—Timothy F. Simone
(74) Attorney, Agent, or Firm—Jacobson Holman PLLC

(57) ABSTRACT

A juice extractor including a helical spindle connected to a power driven source, and a housing having an inlet in the upper part and an outlet in the lower part. The helical spindle includes a fine grinding portion and a refine grinding portion. At the end part of the helical spindle is a drum cap which includes a durable bushing element. The drum cap has a threaded tube portion formed in the lateral direction to join with a pressure control cap which has a squeezing flange formed on the inner part of the circumference thereof so as to press a circular protrusion of the bushing element in order to control the optimum squeezing pressure and maximize the effectiveness of the compression of foodstuff such as fruit or vegetables.

15 Claims, 7 Drawing Sheets

JUICE EXTRACTOR

BACKGROUND OF THE INVENTION

1. Field of Invention

The present invention is directed to a juice extractor, more specifically to improvement of a juicer which can be easily controlled with simple manipulation for optimum squeezing pressure in order to provide the best squeezing force and maximize the effectiveness of the compression depending on the kind of foodstuff such as fruit or vegetables.

2. Description of the Prior Art

A typical structure of a squeezing-type extractor in the prior art relates to a helical spindle connected to a power driving source at one end part without a supporting member at the other end part of the spindle. Due to the absence of a sustaining element for the rotating spindle, blades of the spindle are subject to frictional abrasion with a squeeze housing or a filtering case, resulting in a noisy sound during operation. Thus, problems related to the low rate of juice extraction and deficiency in the mechanical structure remain in the prior art.

To solve the above mentioned problems of juice extractors in the prior art, an utility patent application by the same inventor of this present invention was filed in the Korean Patent Office as the application No. 2001-033462.

As seen in FIG. 1 and FIG. 2, the juice extractor 30 in the prior application comprise a structure related to an inlet 32 in the upper part and an outlet 33 in the lower part of a housing 31, a helical spindle 35 located inside of the housing 31 being connected to a power driving source 34, a filtering case 36 or a squeeze housing (not shown on drawings) which surrounds the outer surface of the helical spindle, and a bushing element 37 made of Acetyl-resin having the property of durability being combined with a nozzle part 40 so that the bushing element 37 can support the end part of the rotating helical spindle 35 with the combination of a drum cap 38.

The size of pin holes 36a formed on the filtering case 36 are designed to fit with the technical specification of the helical spindle 35 which is partitioned into the sector of an inlet grinding portion 35b, a fine grinding portion 35c and a refine grinding portion 35d to enhance the extracting efficiency of juice while in the squeezing operation. In addition, inside of a guide case 36b, a conical extracting portion 35e of the helical spindle 35 being contacted with the elastic packing 39 helps to transport the foodstuff providing an appropriate squeezing pressure for the smooth operation of the juicer.

But the above mentioned structure in the juice extractor 30 has problems in that the squeezing pressure exerted between the guide case 36b and the elastic packing 39 remains constant regardless of the type of the materials to be squeezed, which results in deficiency of the squeezing operation; in addition, a noisy sound due to friction between the rotating helical spindle 35 and the elastic packing 39 is encountered, and furthermore the structure has no typical function or means for guiding effectively to extract the dregs of foodstuff while in the operation of squeezing.

SUMMARY OF THE INVENTION

Accordingly, the present invention is directed to a new juice extractor enabling one to easily set the best squeezing pressure with simple manipulation and eliminating the noisy sound between the helical spindle and the elastic packing.

The present invention provides an improved structure for a juice extractor to maximize the efficiency of juice extraction and to minimize frictional sound with the structural movement of a bushing element in connection with a helical spindle using a pressure control cap so as to adjust the squeezing pressure in a simple way, and further to provide a new constitution for extracting the dregs of foodstuff in a very convenient way.

DETAILED DESCRIPTION OF THE PREFERRED EMBODIMENTS

Hereinafter, the construction and operation of the present invention will be described below in detail as follows.

Figure 1:
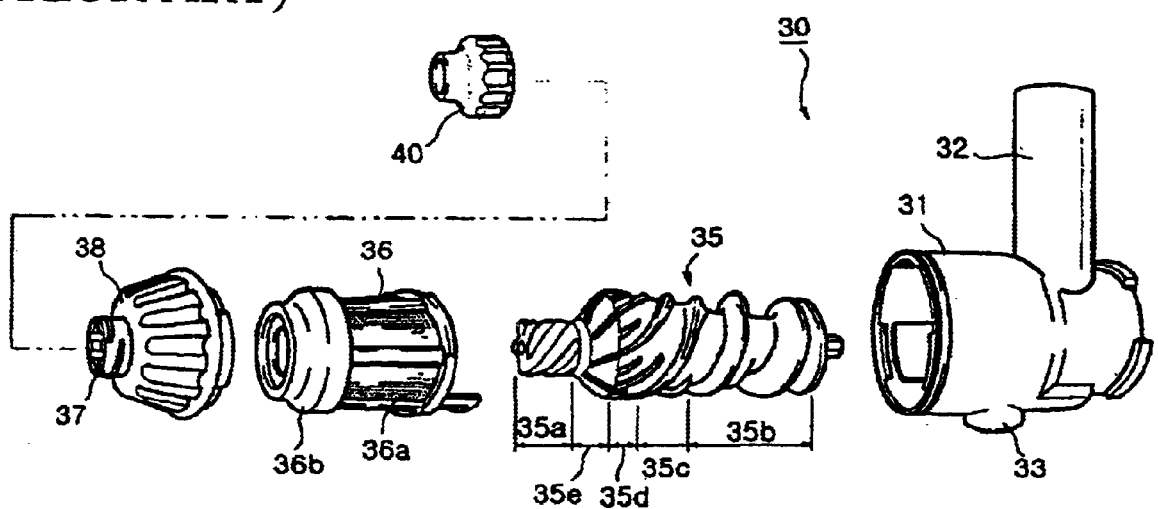
FIG. 1 is a perspective view of the assembling parts of the juice extractor according to the prior art.
Figure 2:
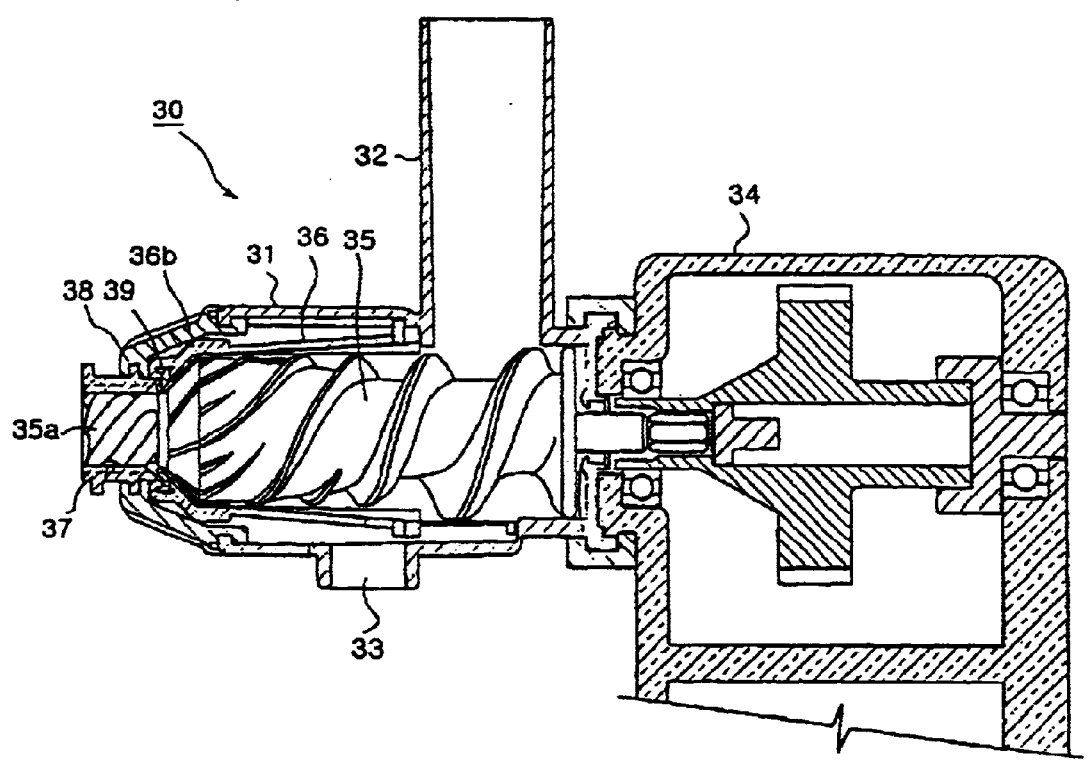
FIG. 2 is a schematic sectional view showing the combination detail of FIG. 1.
Figure 3:
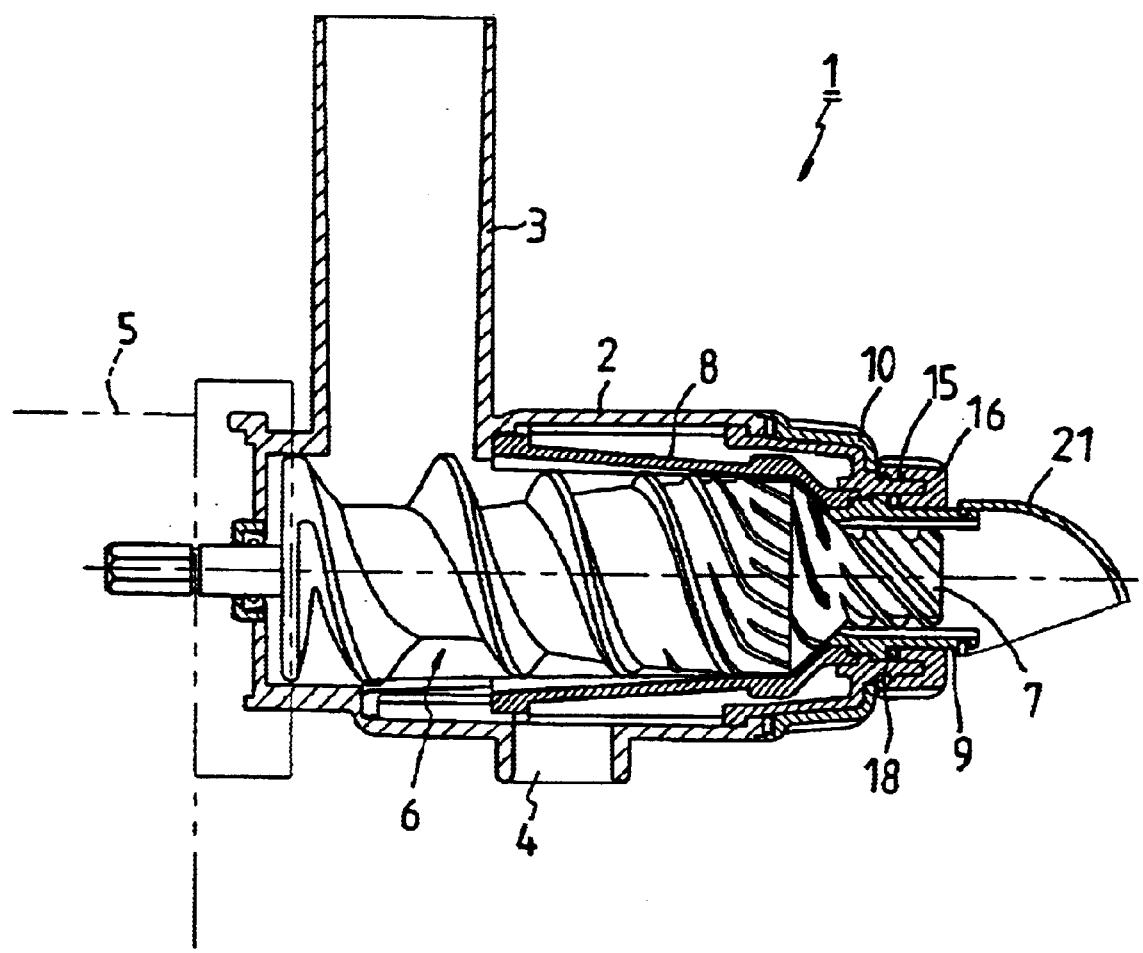
FIG. 3 is a schematic sectional view of the juice extractor according to the present invention.
Figure 4:
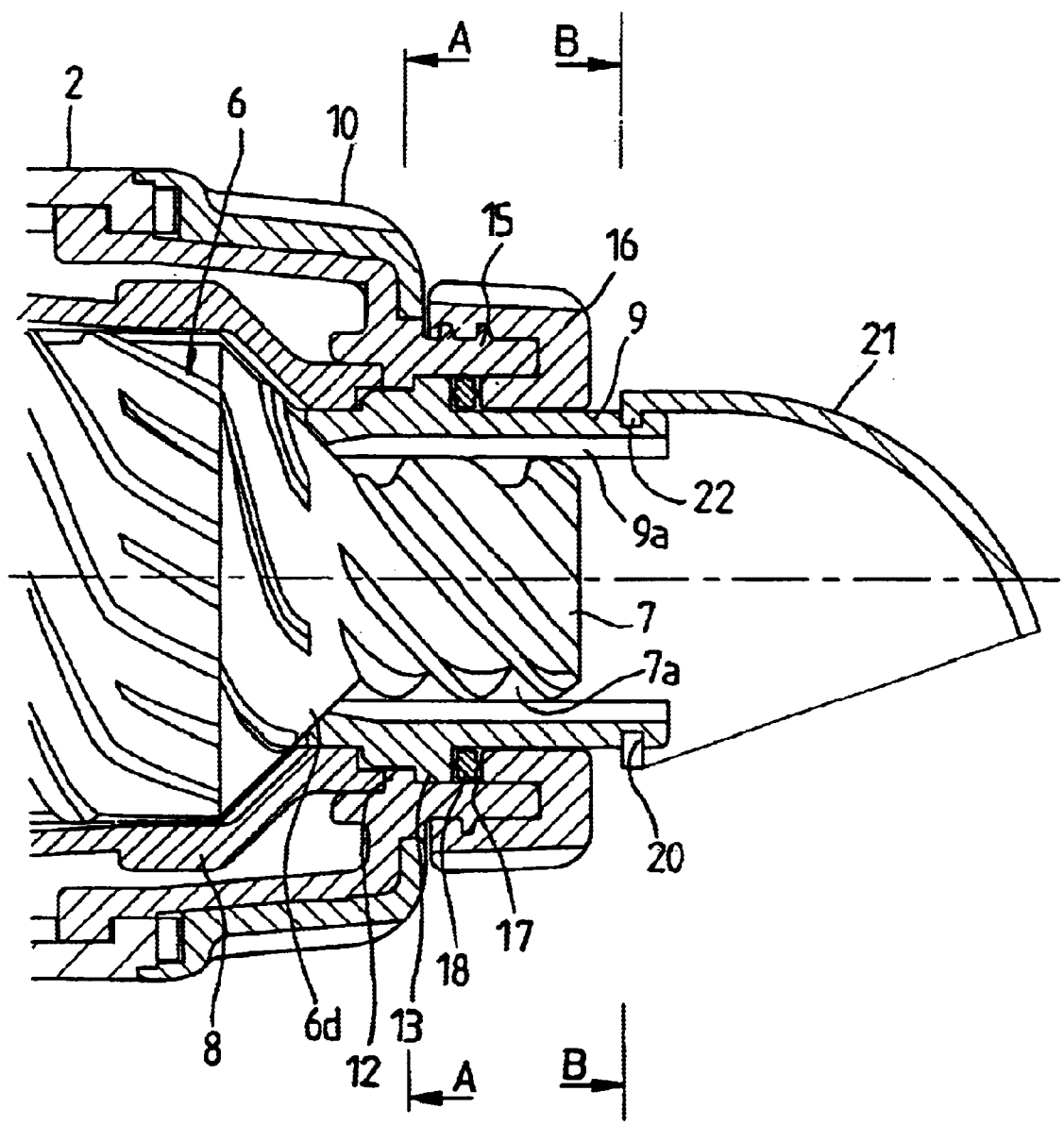
FIG. 4 is a partial end view showing a dregs extracting portion according to the present invention.

As shown in FIGS. 3 and 4, the juice extractor 1 according to the present invention comprises a housing 2 having an inlet 3 in the upper part and an outlet 4 in the lower part for the insertion and extraction of foodstuff, and a helical spindle 6 inside of the housing 2 and connected to a power driving source 5.

Figure 7:
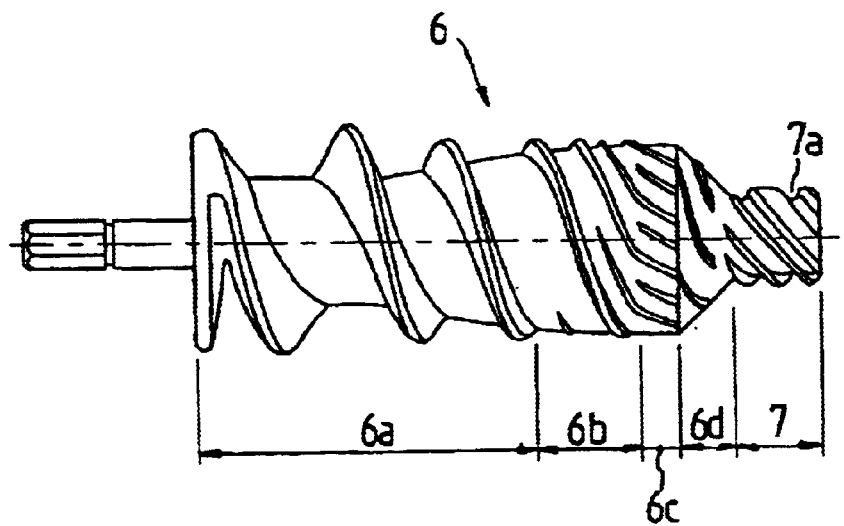
FIG. 7 is an elevational view of a helical spindle according to the present invention.

In detail shown in FIG. 7, the helical spindle 6 is configured to include an inlet grinding portion 6a, a fine grinding portion 6b, a refine grinding portion 6c, a conical extracting portion 6d and a spindle end 7 having a plurality of helical grooves 7a formed on the surface thereof.

Surrounding the helical spindle 6, a filtering case 8 or a squeeze housing (not shown) is mounted on the circumference of the helical spindle 6 and a bushing member 9 made of Acetyl-resin (synthetic resin or metallic substance) having excellent durability against abrasion is inserted in a drum cap 10 along the axis direction so that the bushing element 9 can support the rotating end of the helical spindle 6.

Figure 6:
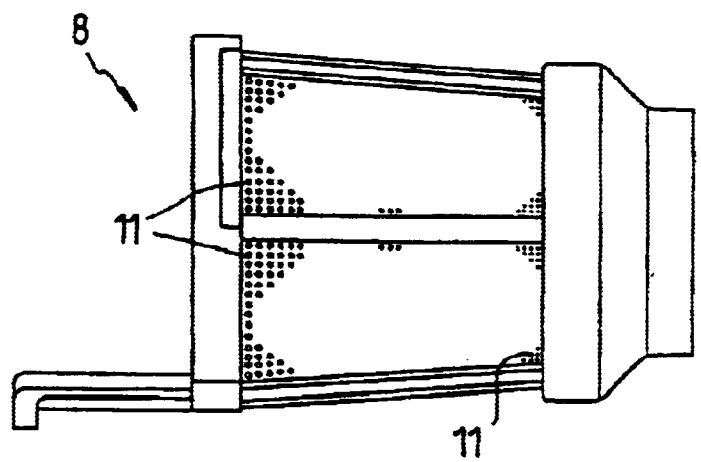
FIG. 6 is an elevational view of a filtering case according to the present invention.

The size of pin holes 11 formed on the filtering case 8 is designed to gradually decrease from the inlet grinding portion 6a to the refine grinding portion 6c as seen in FIG. 6. Since the size of squeezed foodstuff longitudinally along the helical spindle 6 gradually diminishes from the inlet grinding portion 6a to the refine grinding portion 6c passing through the fine grinding portion 6b due to the increased pressure applied to the squeezed foodstuff along the helical spindle, it is necessary to make the size of the pin holes 11 decrease continuously to meet with the decreasing size of foodstuff in the longitudinal direction in order to exclude the dregs of foodstuff in the extracted juice while in the transport of the squeezing operation.

Figure 5:
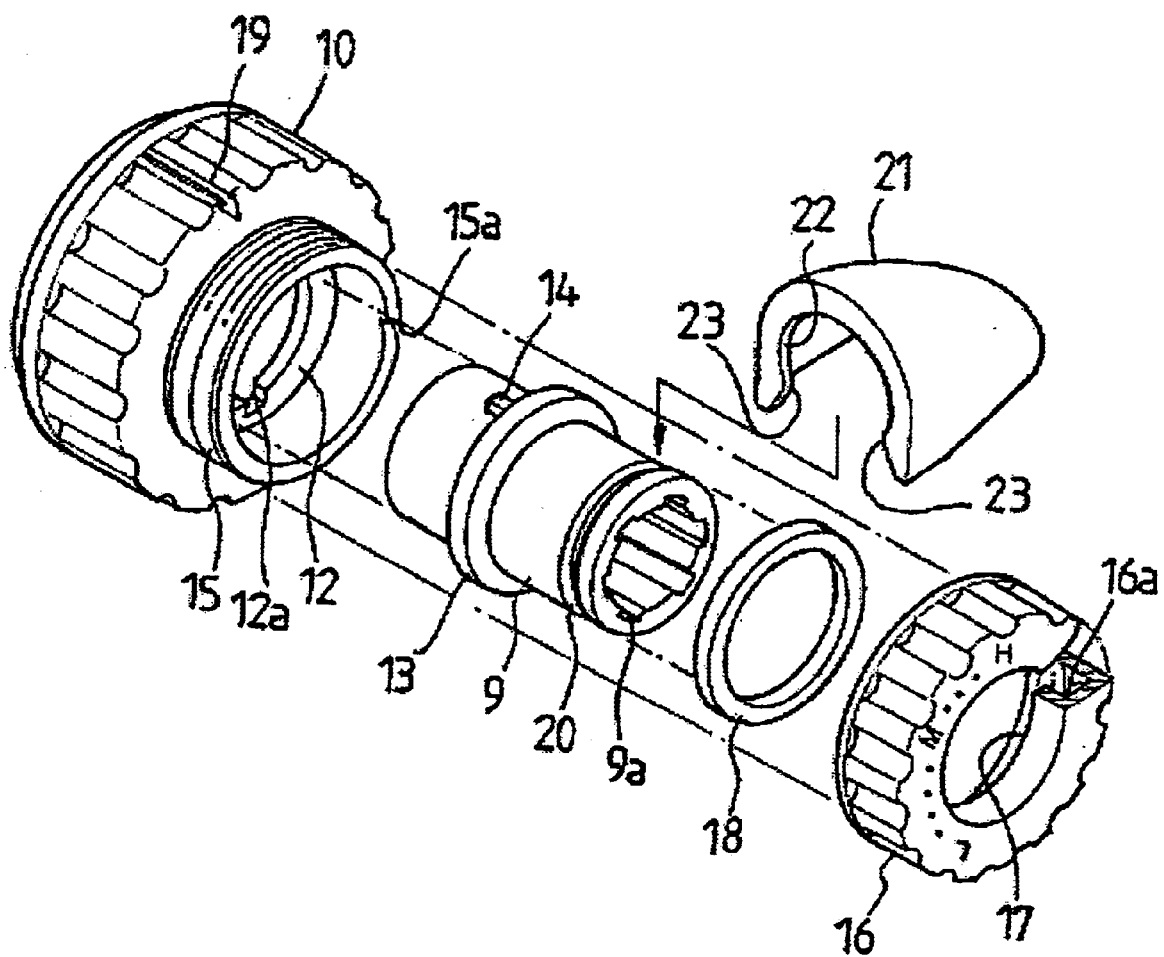
FIG. 5 is a partial perspective view showing the embodiment of squeezing pressure according to the present invention.
Figure 8:
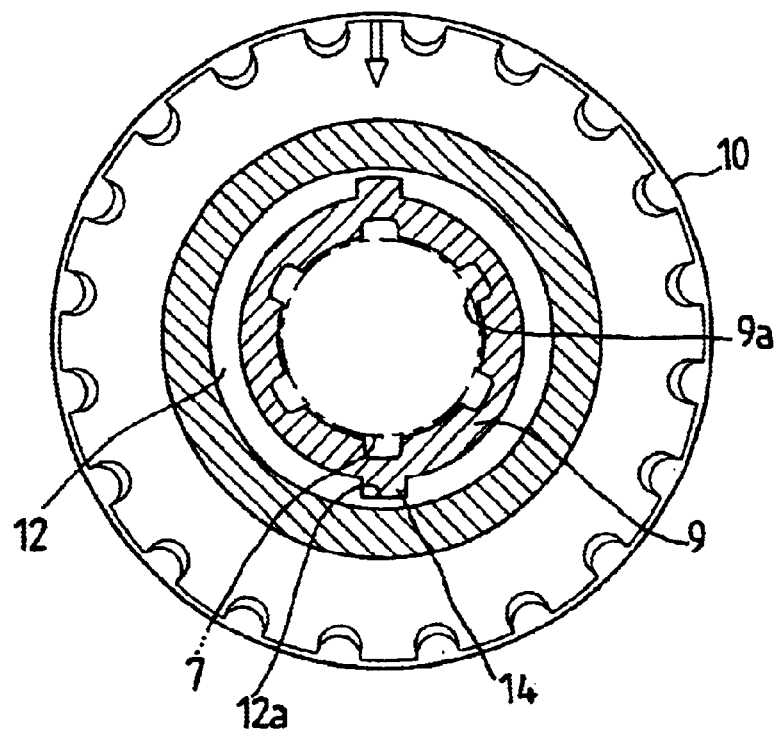
FIG. 8 is a schematic sectional view showing the joined state of a drum cap and a bushing element taken on line A—A of FIG. 4.

As seen in FIGS. 5 and 8, in order to support the rotating axis of spindle end 7, a drum cap 10 is designed to fit with a bushing element 9 which is combined with the spindle end 7 of the helical spindle 6 being contacted with the conical extracting portion 6d. Specifically, the ring stopper 12 formed around the inner circumference of the drum cap 10 is configured to lock a circular protrusion 13 formed on the outer circumference of the bushing element 9. A key notch 12a representing at least one formation around the ring stopper 12 of the drum cap 10 is necessary for locking with a key 14 which is protrusively formed on the bushing element 9 in order to prevent the rotation of the bushing element 9 under the rotation of the spindle end 7.

In detail, the configuration related to the drum cap 10 as seen in FIG. 5 is as follows. A threaded tube 15 is formed at the lateral end of the drum cap 10 in order to combine with a pressure control cap 16 which has a squeezing flange 17 around the inner circumference oppressing the circular protrusion 13 of the bushing element 9.

Between the bushing element 9 and the squeezing flange 17 of the pressure control cap 16, a rubber packing 18 having excellent elasticity is inserted to prevent juice leakage and the flexible movement of the filtering case 8 depending on the squeezing pressure in the housing 2.

In addition, for the safe joint between the threaded tube 15 and the pressure control cap 16, a stopper groove 15a and a screw stopper 16a are formed as shown in FIG. 5, which confine the complete locking state of the pressure control cap 16 and provides a limit on the squeezing pressure.

Figure 10:
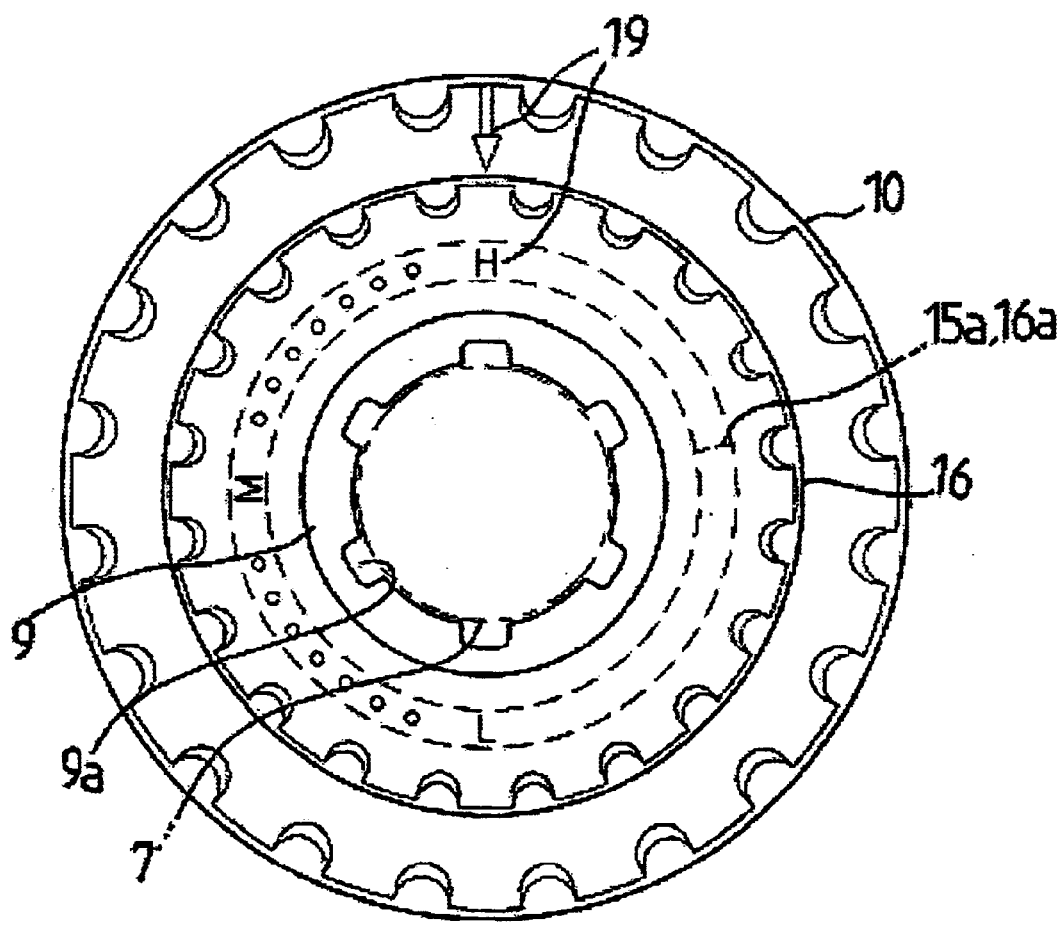
FIG. 10 is a side view showing a pressure indicator according to the present invention.

The indications for the variable squeezing pressure can be revealed by the squeezing indicator 19 in accordance with the screw lock of the pressure control cap 16 in relation to the threaded tube 15 as shown in FIG. 10.

For an example, the character combination between the arrow mark on the surface of the drum cap 10 and the various characters indicating the relative squeezing pressures named on the surface of the pressure control cap 16 allows a user to easily discern the squeezing pressure according to the present invention.

Figure 9:
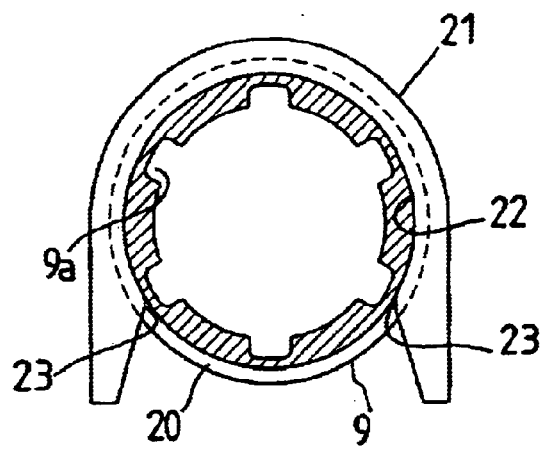
FIG. 9 is a schematic sectional view showing the joined state of a dregs guide cap taken on line B—B of FIG. 4.

On the other hand, at the end part of the bushing element 9 as shown in FIG. 5 or FIG. 9, a circular groove 20 is configured for the mount of a dregs guide cap 21 which can be detachably attached and is rotatable along the circular groove 20.

For the detailed shape of the dregs guide cap 21, it has an inserting edge 22 having an opening in the circumference directed downwardly and the formation of a cap stopper 23 for the secure mounting of the dregs guide cap 21 onto the bushing element 9.

Based on the above mentioned structure, the detailed operational mechanism of the present invention will be described hereinbelow with a process illustration for making juice from foodstuff according to the present juice extractor.

With the insertion of foodstuff into the inlet 3, the juice extractor 1 with electric power is ready to make juice according to the process of squeezing foodstuffs as follows.

The rotating helical spindle 6 having the screw-shaped blades of the inlet grinding portion 6a and the fine grinding portion 6b transports the foodstuff into the filtering case 8 which encircles the helical spindle 6 along the axis direction of the spindle.

The foodstuff transported by the spiral blades is sliced by the rotating blade of the helical spindle 6 and immediately squeezed with the filtering case 8 to result in juice when it enters the filtering case 8. The juice extracted between the filtering case 8 and the rotating helical spindle 6 passes through the pin holes formed on the filtering case 8 and flows from the outlet 4 to the outside.

Through the above transporting process, the remaining foodstuff along the helical spindle 6 is completely squeezed after passing through the area of the refine grinding portion 6c and the conical extraction portion 6d.

After the transporting and squeezing process for making juice, the residual dregs of foodstuff are extracted through the passage of the helical groove 7a formed on the surface of the spindle end 7 which is combined with the dregs extracting groove 9a of the bushing element.

According to the embodiment regarding the shape of the pin holes 11 formed on the filtering case 8, the size of the pin holes 11 gradually decreases to meet with the diminishing size of foodstuff moving longitudinally along the helical spindle 6 from the inlet grinding portion 6a to the refine grinding portion 6c passing through the fine grinding portion 6b. The size variation of the pin holes 11 in the filtering case 8 is linear along the longitudinal direction to exclude effectively the insertion of foodstuff dregs in the juice while in the transporting or the squeezing operation.

According to the present invention, the typical mechanism with respect to the gap adjusting function between the conical extracting portion 6d and the bushing element 9 mounted at the inside part of the drum cap 10 with the pressure control cap 16 enables the squeezing pressure to be adjusted and the pressure setting in the filtering case 8 to be maintained. In detail, the setting and maintaining of the squeezing pressure in the filtering case 8 is related to the combinative structure between the circular protrusion 13 having a key 14 formed on the outer surface of the bushing element 9 and the ring stopper 12 having the key notch 12a, which prevents rotational motion of the bushing element 9 although the bushing element 9 serves as a supporting means for the rotation of the spindle end 7. As a shock absorbing means, the rubber packing 18 inserted between the bushing element 9 and the squeezing flange 17 absorbs the applied pressure from the pressure control cap 16 and transmits it to the foodstuff in the filtering case 8 providing the easy extraction of the foodstuff dregs effectively with the help of the inner squeezing pressure while in the transportation of foodstuff.

Compared with the prior art, the present invention drastically enhances the extraction efficiency of the foodstuff dregs and minimizes the frictional noise with maximum efficiency of the juice extraction.

On the other hand, the screw stopper 16a formed at the inside part of the pressure control cap 16 joins the stopper groove 15a formed on the threaded tube 15 of the drum cap 10 for a limit setting on the squeezing pressure. With this structure, the pressure control cap 16 can be easily detached after the complete screw locking of the pressure control cap 16 and provides a limit for the applied squeezing pressure.

As seen in FIG. 10, the squeezing indicator and the characters denoted on the outer surface of the drum cap 10 and the pressure control cap 16 enable a user to control the squeezing pressure of the juice extractor in a simple way.

In addition, the circular groove 20 formed on the circumference of the bushing element 9 provides for rotatable mounting of the dregs guide cap 21 along the circumferential end of the bushing element 9. The dregs guide cap 21 prevents the scattering of foodstuff dregs during operation and is used for the checking of the extracted dregs after rotating the cap 21 along the circular groove 20 in a very simple way. In the case of no smooth dregs extraction, a user can adjust the distance of gap between the conical extracting portion 6d of the helical spindle 6 and the bushing element 9 using the pressure control cap 16 for the smooth extraction of juice and dregs.

For an example, in the case of fruit foodstuffs, the setting for the squeezing pressure in connection with the pressure control cap 16 is suitably a low setting, but for the case of tuber-type foodstuffs, the setting would be higher while other sorts of vegetables may occupy the medium setting position.

In summary, the juice extractor 1 according to the present invention includes a helical spindle 6 located inside of a housing 2 and connected to a power driving source 5, the housing 2 having an inlet 3 in the upper part and an outlet 4 in the lower part, a filtering case 8 or a squeeze housing (not shown) which encircles the helical spindle 6 which is divided into the part of an inlet grinding portion 6a, a fine grinding portion 6b and a refine grinding portion 6c. At the end part of the helical spindle 6, a drum cap 10 which encircles a bushing member 9 having high durability against abrasion is connected to the spindle end 7 for the support of axis rotation. At the lateral direction of the drum cap 10, a threaded tube 15 is formed to join with a pressure control cap 16 which has a squeezing flange 17 on the inner part of the circumference so as to press against the circular protrusion 13 of the bushing element 9.

In addition, the size of pin holes 11 formed on the filtering case 8 is designed to gradually decrease from the inlet grinding portion 6a to the refine grinding portion 6c and the bushing element 9 is designed to move with the operation of the pressure control cap 16 in order to control the gap adjusting junction and the squeezing pressure between the helical spindle 6 and the bushing element 9. Moreover, a dregs guide cap 21 is mounted to the edge of the bushing element 9 for guiding the dregs of foodstuff.

Accordingly, the present invention provides a very useful and practical juice extractor in that the squeezing pressure related to transporting foodstuff in the filtering case 8 can be easily controlled with simple manipulation for the maximum extraction efficiency, the achievement of minimum friction among constituting members enables significant noise reduction and elongates the life time of the juicer, and furthermore the foodstuff dregs are easily extracted.

What is claimed is:

1. A juice extractor comprising:
   a housing having an inlet in an upper part and an outlet in a lower part;
   a helical spindle including an inlet grinding portion, a fine grinding portion, a refine grinding portion, a conical extracting portion and a spindle end, said helical spindle being connected to a power driving source;
   a filtering case encircling said helical spindle;
   a drum cap having a ring stopper configured to fit a circular protrusion formed on a bushing element;
   said bushing element having a dregs extracting groove insertable into said drum cap;
   a pressure control cap having a squeezing flange so as to oppress said circular protrusion of said bushing element; and
   a threaded tube portion of said drum cap formed to join said pressure control cap.

2. The juice extractor as recited in claim 1, wherein said filtering case includes a plurality of pin holes, a size of said pin holes decreasing continuously from a position of said inlet grinding portion to a position of said refine grinding portion passing through said fine grinding portion.

3. The juice extractor as recited in claim 1, wherein said ring stopper formed on said drum cap includes a key notch designed to fit with a key protrusively formed on said bushing element.

4. The juice extractor as recited in claim 1, further comprising:
   an elastic rubber packing provided between said bushing element and said squeezing flange of said pressure control cap.

5. The juice extractor as recited in claim 1, further comprising:
   a stopper groove formed on said threaded tube portion and a screw stopper formed on said pressure control cap in order to confine a locking state of said pressure control cap.

6. The juice extractor as recited in claim 1, further comprising:
   a squeezing indicator having markings on the surface of said drum cap and said pressure control cap such that alignment of the markings indicates a squeezing pressure.

7. The juice extractor as recited in claim 1, further comprising:
   a circular groove provided for mounting of a dregs guide cap which can be detachably attached and is rotatable along said circular groove.

8. A juice extractor comprising:
   a housing having an inlet and an outlet;
   a helical spindle having grinding portions, a conical extracting portion and a spindle end connected to a driving source;
   a filtering case encircling said helical spindle;
   a drum cap fitting over said conical extracting portion and said spindle end, said drum cap having a threaded tube portion;
   a bushing element inserted within said drum cap and over said spindle end; and
   a pressure control cap formed to join with said threaded tube portion of said drum cap and adjustably apply squeezing pressure against said threaded tube portion and said bushing inserted therein.

9. The juice extractor as set forth in claim 8, wherein said drum cap has a ring stopper configured to fit an annular protrusion formed on said bushing element.

10. The juice extractor as set forth in claim 9, wherein said pressure control cap includes a squeezing flange that oppresses said annular protrusion.

11. The juice extractor as set forth in claim 10, further comprising an elastic rubber packing provided between said bushing element and said squeezing flange of said pressure control cap.

12. The juice extractor as set forth in claim 9, wherein said ring stopper includes a key notch designed to fit a key protrusively formed on said bushing element.

13. The juice extractor as set forth in claim 8, wherein said threaded tube portion includes a stopper groove which engages a screw stopper on said pressure control cap to confine a locking state of said pressure control cap.

14. The juice extractor as set forth in claim 8, wherein said bushing includes a circular groove for detachably mounting a dregs guide cap that is rotatable along said circular groove.

15. The juice extractor as set forth in claim 8, wherein said drum cap includes squeezing indicator markings adjustably aligned with corresponding markings on said pressure control cap to indicate a current squeezing pressure.

* * * * *